(12) United States Patent
Gervais et al.

(10) Patent No.: US 9,162,749 B2
(45) Date of Patent: Oct. 20, 2015

(54) BLADE FOR A HELICOPTER ANTI-TORQUE DEVICE

(71) Applicant: AIRBUS HELICOPTERS, Marignane (FR)

(72) Inventors: Marc Gervais, Marseilles (FR); Benoit Gresle, Pelissanne (FR); Sebastein Finck, Marseilles (FR); Laurent Sudre, Pelissanne (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/528,507

(22) Filed: Oct. 30, 2014

(65) Prior Publication Data

US 2015/0050137 A1    Feb. 19, 2015

Related U.S. Application Data

(63) Continuation of application No. 13/314,258, filed on Dec. 8, 2011, now Pat. No. 8,974,189.

(30) Foreign Application Priority Data

Dec. 15, 2010   (FR) ..................... 10 04891

(51) Int. Cl.
  *B64C 11/16*    (2006.01)
  *B64C 11/18*    (2006.01)
  *B64C 27/82*    (2006.01)
(52) U.S. Cl.
  CPC ............... *B64C 11/18* (2013.01); *B64C 27/82* (2013.01); *B64C 2027/8254* (2013.01); *Y10S 416/02* (2013.01); *Y10S 416/05* (2013.01)
(58) Field of Classification Search
  CPC .. B64C 11/18; B64C 27/82; B64C 2027/8254
  USPC ............ 416/223 R, 223 A, 242, 243, DIG. 2, 416/DIG. 5; 244/17.21; 415/129
  See application file for complete search history.

(56) References Cited

U.S. PATENT DOCUMENTS

| 4,768,815 A | 9/1988 | Harmon |
| 5,566,907 A | 10/1996 | Marze et al. |

(Continued)

FOREIGN PATENT DOCUMENTS

| EP | 0332492 A1 | 9/1989 |
| EP | 0592764 A1 | 4/1994 |

(Continued)

OTHER PUBLICATIONS

Search Report and Written Opinion; dated: Jul. 13, 2011; Application No. FR 1004891.
Korean Office Acton Dated Oct. 8, 2013, Application No. 2011-0133759, Applicant Eurocopter, 5 pages.

(Continued)

*Primary Examiner* — Dwayne J White
*Assistant Examiner* — Alexander White
(74) *Attorney, Agent, or Firm* — Brooks Kushman P.C.

(57)   ABSTRACT

A blade (1) for a tail anti-torque device of a helicopter, said device comprising a ducted rotor (13). The blade (1) has an assembly of sections, a leading edge (2) and a trailing edge (3); a stacking line (4) of the profiles extending at a distance lying in the range 25% to 50% of the chord (C). The stacking line (4) presents a shape that is curved having successively from the root (5) to the end (6) of the blade a back sweep, a forward sweep, and a last back sweep; and a chord (C) that becomes larger going towards the end (6) of the blade (1) over at least the end profile (1*a*).

19 Claims, 2 Drawing Sheets

(56) References Cited

U.S. PATENT DOCUMENTS

| | | | |
|---|---|---|---|
| 5,961,289 | A | 10/1999 | Lohmann |
| 6,065,937 | A | 5/2000 | Hunt |
| 6,558,123 | B1 | 5/2003 | Spaggiari |
| 6,749,401 | B2 | 6/2004 | Vanmoor |
| 6,908,287 | B2 * | 6/2005 | Cho et al. ............... 416/189 |
| 8,286,908 | B2 | 10/2012 | Kebrle |
| 2004/0022635 | A1 | 2/2004 | Vanmoor |

FOREIGN PATENT DOCUMENTS

| | | |
|---|---|---|
| EP | 2085310 A1 | 8/2009 |
| FR | 2719549 A1 | 11/1995 |
| GB | 212018 A | 3/1924 |
| KR | 20070072850 A | 7/2007 |
| WO | 2004011330 A1 | 2/2004 |
| WO | 2006110156 A2 | 10/2006 |
| WO | 2009054815 A1 | 4/2009 |

OTHER PUBLICATIONS

"Taylor Series", Apr. 7, 2005, Wikipedia, pp. 1-4, http://web.archive.org/web/20050407044309/http:en.wikipedia.org/wiki/Taylor_series.

Banas et al., "25th Annual Student Design Competition Graduate Category: Athena", 2008, Daniel Guggenheim School of Aerospace Engineering Georgia Institute of Technology, p. 36.

"Taylor Series", Apr. 7, 2005, Wikipedia, pp. 1-4, http://web.archive.org/web/20050407044309/http://en.wikipedia.org/wiki/Taylor_series.

Banas et al., "25th Annual Student Design Competition Graduate Category: GT Athena", Daniel Guggenheim School of Aerospace Engineering Georgia Institute of Technology, 2008, 119 Pages.

French Search Report and Written Opinion Dated Jul. 13, 2011, Application No. FR 1004891, 8 Pages.

Korean Office Action Dated Aug. 8, 2013, Application No. 2011-0133759, Applicant Eurocopter, 5 Pages.

* cited by examiner

BLADE FOR A HELICOPTER ANTI-TORQUE DEVICE

CROSS REFERENCE TO RELATED APPLICATIONS

This application is a continuation of U.S. application Ser. No. 13/314,258, filed Dec. 8, 2011, which claims priority to French patent application FR 10/04891 filed on Dec. 15, 2010, the disclosures of which are incorporated in their entirety by reference herein.

BACKGROUND OF THE INVENTION (1) Field of the Invention

The invention relates to the general technical field of anti-torque rotors for rotorcraft, in particular for helicopters. More precisely, the invention relates to the technical field of ducted tail rotor anti-torque devices with blades angularly distributed using phase modulation, and for use in helicopters, in particular. Such anti-torque devices differ from non-ducted, conventional anti-torque rotors that do not constitute the subject matter of the present invention.

The invention relates in particular to the above-mentioned anti-torque devices, also known as "Fenestron®" devices, in which a flow-guiding stator with stationary airfoil profile vanes is located downstream from an anti-torque rotor in the airflow passage or "duct".

(2) Description of Related Art

Such anti-torque devices are known in particular from FR 2 719 549, which describes a relationship for angularly distributing the blades of the rotor so as to distribute sound energy as effectively as possible over the entire frequency spectrum, while taking account of the mechanical limitations on connecting the blades. The figures in that document show blades having shapes that are substantially rectangular in plan view. In addition, in order to avoid interaction between the wake of any one of the blades of the rotor with any one of the guide vanes taking place simultaneously over the entire span of the vane, the guide vanes are arranged in a non-radial manner. By way of example, each of the vanes is inclined relative to the radial direction by an angle that preferably lies in the range 1° to 25°, going from the axis of the passage towards its periphery and sloping in the direction opposite to the direction of rotation of the rotor. Such a configuration is favorable to taking up the torque which is exerted as reaction to the rotation of the rotor, on a central body located substantially coaxially in the passage and containing members for driving the rotor and members for controlling the collective pitch of the blades. Such torque takeup can then be withstood by the vanes situated in the passage.

A ducted anti-torque device provided with curved blades is also known from document WO 2006/110156. That document discloses curved blades combined with guide vanes that are offset radially and transversely in order to reduce the interaction noise between said blades and said vanes. Each of the described blades presents a geometrical shape with a single curve. An anti-torque device including such blades and such an arrangement of vanes is not capable of significantly improving its performance in order to approach the performance of a conventional anti-torque rotor.

Document U.S. 2004/0022635 or WO 2004/011330 describes a configuration of a concave/convex propeller blade following the model of a natural wave. The leading edge of such a blade presents a concave segment followed by a convex segment. The leading edge and the trailing edge are rounded so as to encourage the formation of an appropriate fluid flow around the surfaces concerned and so as to limit the formation of vortices in order to limit aerodynamic drag. As described, the best results are obtained by modeling the airfoil surfaces from a function that is sinusoidal or tangential to the curve representing the leading edge of each blade, with this being approximate since the amplitude is not defined. A blade presenting such a geometrical shape nevertheless appears to be unsuitable for improving the performance of a ducted anti-torque device. In other words, the definition of each blade does not present the required characteristics for satisfying the strict industrial requirements needed for making a ducted tail rotor anti-torque device for a rotorcraft.

Furthermore, the figures of said document U.S. 2004/0022635 show blades having an end chord that is smaller than the maximum chord of said blade.

Document EP 0 332 492 describes a blade for a high performance ducted propeller, in which the aerodynamically active portion is of rectangular shape. Its maximum camber increases from substantially 0 to substantially 0.04. Its relative maximum thickness decreases from substantially 13.5% to substantially 9.5%.

Document EP 2 085 310 describes a ducted anti-torque rotor in which the noise emitted at a frequency FE and perceived at a frequency FP is minimized. In that rotor, an airflow guide stator is located behind the blade path of said rotor (13).

Document WO 2009/54815 describes axial fan blades having airfoil surfaces with corrugations that give rise to suction and to pressure. The corrugations also increase the stiffness of the blades. In the figures, the blades are flared going from their roots to their free ends.

Document GB 212018 describes propellers made from a single piece of metal.

BRIEF SUMMARY OF THE INVENTION

An object of the present invention is thus to propose a blade having a new profiled three-dimensional geometrical shape that is twisted relative to a twist line in application of a predetermined twist relationship that makes it possible to provide a ducted anti-torque device for helicopters in particular, and that does not present the above-mentioned limitations.

An object of the present invention also makes it possible to propose a three-dimensional geometrical shape for a blade for making a ducted anti-torque device for helicopters in which the efficiency in terms of anti-torque force is improved compared with known ducted anti-torque devices.

Another object of the present invention seeks to propose a ducted anti-torque device improving the performance in terms of anti-torque force, while not degrading the improvements in terms of sound emission and of safety that are presented by ducted anti-torque devices.

The objects given to the invention are achieved by means of a blade for a tail anti-torque device of a rotorcraft, said device comprising a ducted rotor, said profiled blade having a three-dimensional geometrical shape defined by different airfoil profile sections extending between a leading edge and a trailing edge of the blade and defined radially by a root section and by an end section of the blade; at least two airfoil profile sections having different chord values along a stacking line extending from the root section to the end section, the blade being twisted, wherein the blade includes a stacking line of the airfoil profile sections that, prior to twisting, defines a plane extension surface defined radially from the root section to the end section, and a twisting line of the plane extension surface that is defined by a predetermined twisting relationship, said stacking line extending at a distance lying in the range 25% to 50% of the chord from the leading edge and presenting a curve on the plane extension surface comprising in succession from the root section: a first back sweep; a forward sweep; and finally a last back sweep going to the end section; said root section of airfoil profile having a chord less than the chord of the end section of airfoil profile section, and said chord of the airfoil profile sections becoming larger from the root section going towards the end section, which has a chord that is equal to or less than 1.6 times the reference chord of the root section.

It can be observed that the term "airfoil profile section" designates the entire surface corresponding to a plane cross-section of a blade, said cross-section being orthogonal to the pitch axis (as defined below) and the outline of said section having the shape of an airfoil profile.

In an embodiment of the blade in accordance with the invention, the relative thickness of the sections decreases progressively in the radial direction going from the blade root section towards the blade end section, so that the end section presents a relative thickness of the order of 9% to 6%, and preferably 6.9%.

In another aspect, the relative thickness of the root section lies in the range 9% to 14%, and is preferably equal to 12%.

In an embodiment of the blade in accordance with the invention, the maximum chord C at the end of the blade reaches the value of the reference chord $C_{ref}$ multiplied by a factor $a_c$ that is greater than unity, and in particular greater than or equal to 1.1, and less than or equal to 1.6.

In an embodiment of the blade in accordance with the invention, the factor $a_c$ is equal to 1.38.

In an embodiment of the blade in accordance with the invention, the stacking line extends at a distance of 30% of the chord from the leading edge of the airfoil profiles.

In an embodiment of the blade in accordance with the invention, the blade comprises a set of six different airfoil profile sections along the stacking line.

In an embodiment of the blade in accordance with the invention, the leading edge presents in continuity from the root section of airfoil profile to the end section of airfoil profile a shape that is concave, and then convex.

In an embodiment of the blade in accordance with the invention, the chord varies in application of a relationship of the following kind:

$$C(r) = C_{ref}, \text{ if } k \leq r \leq b_c \times R_{max}$$

and $$C(r) = C_{ref} + [C_{max} - C_{ref}] \times \frac{[r - (b_c \times R_{max})]^n}{\{R_{max} - (b_c \times R_{max})\}^n} \text{ if } r \geq b_c \times R_{max}$$

with:
 r: the radius of a given section of airfoil profile;
 k: radius of the root section of airfoil profile;
 C(r): value of the chord at a radius r;
 $R_{max}$: maximum radius of the end section airfoil profile;
 $C_{ref}$: reference chord of the root section of airfoil profile;
 $C_{max}$: chord of the end section of airfoil profile, equal to $(a_c \times C_{ref})$;
 ×: multiplication sign; and
 $b_c$ and n: first and second predetermined constants.

It should be observed that in the present specification the "radius" of a section is used to mean the distance between said section and the center of rotation of the rotor fitted with the blade in question.

In an embodiment of the blade in accordance with the invention, the first constant $b_c$ lies in the range zero to unity. A value of zero for the first constant $b_c$ corresponds to a value of zero for the radius k of the root section of airfoil profile.

In an embodiment of the blade in accordance with the invention, the first constant $b_c$ is 0.68 such that the beginning of the enlargement of the chord is located substantially at 0.68 times the maximum radius of said blade.

In an embodiment of the blade in accordance with the invention, the second constant n lies in the range 1 to 5.

In an embodiment of the blade in accordance with the invention, the second constant n is 1.7.

In an embodiment of the blade in accordance with the invention, the stacking line is curved, following a trace relative to a generally radial direction of the rotor based on the mean pitch axis of each blade and given by a polynomial of the following kind:

$$Y_{AC}/C_{ref} = a_e \times Q^3 + b_e \times Q^2 + c_e \times Q \text{ with } 0 \leq Q \leq 1$$

where:

$$Q = \frac{r - k}{R_{max} - k}$$

is a non-dimensional number;
 $Y_{AC}$ is the position of the stacking line of the sections of airfoil profile at radius r; and
 $a_e$, $b_e$ and $c_e$ are first, second, and third predetermined values.

In an embodiment of the blade in accordance with the invention, the first, second, and third values $a_e$, $b_e$ and $c_e$ are selected so as to obtain a stacking line that extends in a distribution that is substantially identical on either side of a geometrical mean pitch axis of the blade so as to balance the pitch control moments acting on the blade.

In an embodiment of the blade in accordance with the invention, the first, second, and third values $a_e$, $b_e$ and $c_e$ are respectively −2.5681, +3.9238, and +1.3558.

Under such conditions, the above data taken as a whole makes it possible to define the plane extension surface. The looked-for geometrical shape of the blade is then obtained by twisting the sections of airfoil profile in accordance with the predetermined twisting relationship about the twist line corresponding to the stacking axis, i.e. by twisting said plane extension surface.

The objects given to the invention are also achieved with the help of an anti-torque device including a fairing defining an airflow passage having arranged therein a rotor having blades as specified above, rotor drive members, and members for adjusting the pitch of said blade. Naturally and where appropriate, the device may also include in the airflow passage a stator for guiding the stream of air and made up of vanes of airfoil profile.

In the present specification, the term "sweep" designates the curved shape in the local plane of the blade, which may be directed substantially forwards as in "forwardly swept" or towards the rear as in "backswept", corresponding respectively towards the leading edge and towards the trailing edge of the blade.

In addition, the stacking line is defined as a geometrical construction line on which the various airfoil profiles making up the blade are stacked and assembled together, said various airfoil profiles defining the various sections that exist between the root section directed towards the axis of the rotor and the end section at the maximum radius. Extending this profiled zone there may be an optional arm for driving said blade.

The pitch axis is determined in such a manner that the static moments about said axis on the blade are as small as possible. It is therefore advantageous to cause the stacking line to correspond with the pitch line when the stacking line is firstly a straight line and secondly the location of the aerodynamic focuses of the airfoil profiles. For a curved stacking line, the stacking line is defined in such a manner that its two ends lie on the mean pitch axis.

Furthermore, the term "blade path" is defined to mean the space in which the blade may extend at its various angular pitch settings.

Under such conditions, a blade in accordance with the invention advantageously makes it possible to provide a ducted anti-torque device that presents an increase in maximum thrust of the order of 4%.

Another advantage of the ducted anti-torque device in accordance with the invention lies in a reduction in its power consumption of the order of 10%.

Another advantage of a ducted anti-torque device in accordance with the invention lies in a significant reduction in the static control force needed for setting the pitch of the rotor blade.

A blade in accordance with the invention also makes it possible to reduce the monopole noise (so-called "thickness" noise) due to the large variation in chord at the end. This variation in chord generates a modification in the sound signals emitted by each section of the blade. Consequently the sound signals are different for each section of the blade. This prevents the sound waves as received by a far observer from adding together effectively. Furthermore, this variation in chord at the end of the blade does not increase the thickness noise insofar as said large chord is compensated at the end by a smaller relative thickness. In this respect, a real thickness is conserved that is equivalent to the thickness of a blade having a rectangular shape in plan view, in spite of the increase in chord towards the end.

Another advantage of the blade in accordance with the invention lies in a reduction of interaction noise between the rotor blades and the stator guide vanes (so-called "dipolar" noise or "load" noise). The trailing edges of the blades that are curved in the above-specified direction prevent the vortex sheet from a blade striking a stationary vane in parallel manner. The curved trailing edge gives rise to a phase shift in the soundwaves received by a far observer and thus contributes to reducing the noise received by said observer.

Another advantage of the blade in accordance with the invention lies in a reduction in trailing edge noise (interaction between parietal pressure fluctuations and the trailing edge) as a result of the curved shape of said trailing edge. The three-dimensional effects generated by the curved trailing edge that is curved in the above-specified direction serves to compensate the wake deficit observed at the trailing edge (said deficit corresponding to a reduction in the flow speed of the air downstream from the trailing edge due to the presence of the blade in the flow), thereby reducing the trailing edge noise that presents a broadband frequency characteristic. Compensating the wake deficit also prevents turbulent elements becoming correlated, thereby reducing the impact of the rotor wake on the stator vanes and consequently enabling tonal noise to be reduced (i.e. the noise produced by frequency harmonics that are correlated with the speed of rotation and the number of blades of the rotor).

In other words, since the blade has a geometrical shape that is generally curved, the turbulent wake from said blade is likewise curved. Thus, when the wake from the blade meets a guide vane, the wake does not strike said vane in parallel. This also makes it possible to reduce the noise that is perceived.

Another advantage of the blade in accordance with the invention lies in the improvement in the general performance of said blade. For given lift, such a blade makes it possible to reduce the peripheral speed of the rotor. Such a reduction in peripheral speed gives rise to a systematic reduction in the amounts of noise generated by all of the noise sources of the rotor.

Another advantage of the blade in accordance with the invention lies in an angular phase offset between the leading edge and the trailing edge at the end of the blade. The increase in chord at the end of the blade in combination with the curved shape of the stacking line makes it possible to obtain different sweeps between the leading edge and the trailing edge. This produces a phase offset in the soundwaves in the event of any interaction between a blade and the turbulence generated by the preceding blades. The perceived noise is thus diminished.

BRIEF DESCRIPTION OF THE SEVERAL VIEWS OF THE DRAWINGS

The invention and its advantages appear in greater detail from the context of the following description of an embodiment given by way of non-limiting illustration and with reference to the accompanying figures, in which.

DETAILED DESCRIPTION OF THE INVENTION

Elements that are structurally and functionally identical and present in more than one of the figures are given the same numerical or alphanumerical reference in each of them.

Figure 1:
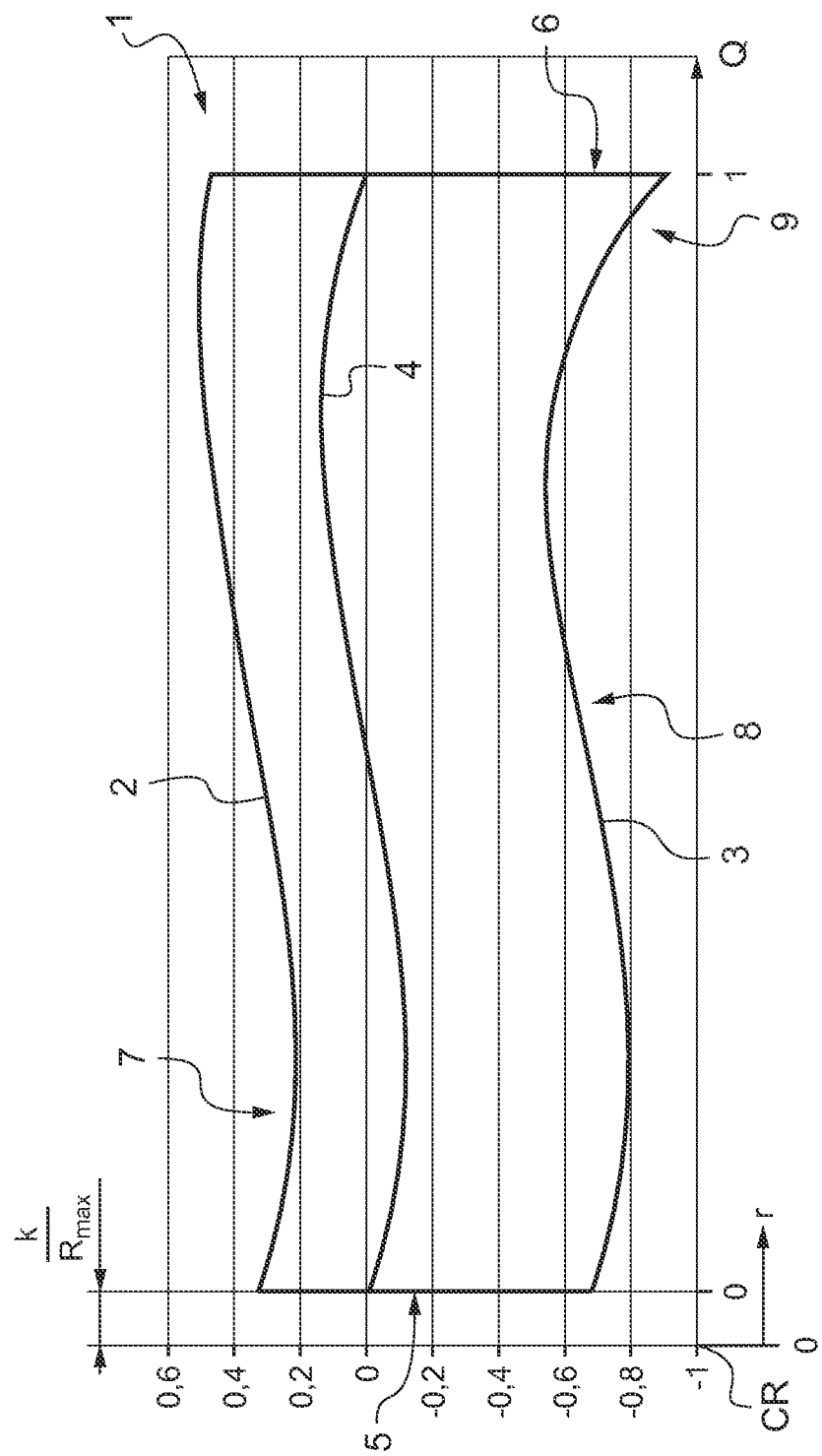
FIG. 1 is a plan of an embodiment of a blade in accordance with the invention.
Figure 2:
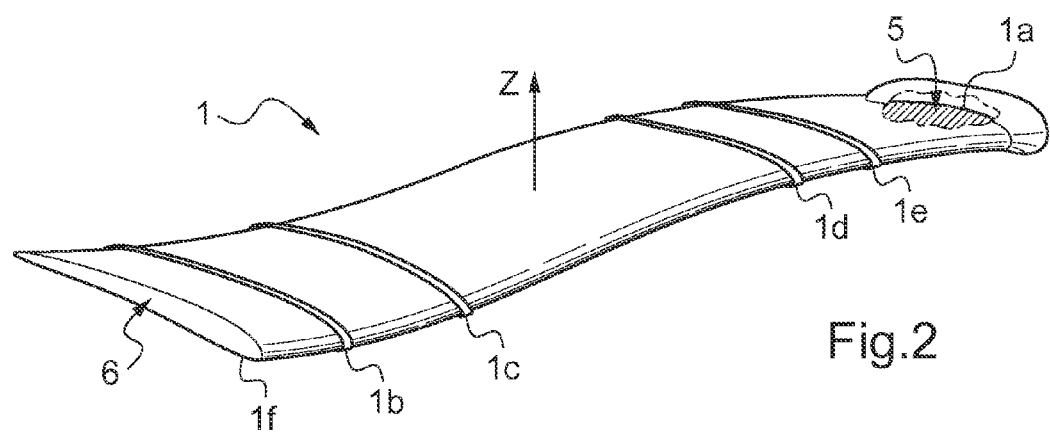
FIG. 2 is a perspective view of an embodiment of a blade in accordance with the invention.

The objects given to the invention are achieved with the help of a blade 1 for a tail anti-torque device of a helicopter. The blade 1, shown diagrammatically in FIG. 1, by way of example, comprises an assembly of airfoil profile sections and presents a leading edge 2 and a trailing edge 3. More precisely, FIG. 1 shows a blade 1 prior to twisting relative to a line of twist 4 in compliance with a predetermined twisting relationship, and as a result it presents a plane extension surface defined firstly between the leading edge 2 and the trailing edge 3 of the airfoil profile sections, and secondly between the root section 5 and the end section 6 having respective airfoil profiles 1a and 1f (FIG. 2). In other words, this plane extension surface corresponds substantially to the plane defined by the chords of the airfoil profiles, prior to twisting.

The assembly comprises at least two different chord sections, and preferably six different chord sections having airfoil profiles 1a, 1b, 1c, 1d, 1e, and 1f along a stacking line 4. Reference may also be made to FIG. 2.

The stacking line 4 of the airfoil profile sections extends at a distance lying in the range 25% to 50% of the chords of said airfoil profiles, starting from the leading edge 2 of said profiles, and consequently from the leading edge of the blade 1, prior to twisting. This stacking line 4 presents a curved shape in the plane extension surface (plane of FIG. 1), comprising in succession from the root section 5 to the end section 6 of the airfoil zone of the blade 1: a back sweep 7; a forward sweep 8; and a last back sweep 9.

FIG. 1 also specifies the following points:
the center of the rotor CR;
the radius r of each section.

Furthermore, the profiled zone extends radially from a non-dimensional number Q equal to 0 out to a value of this non-dimensional number Q that is equal to unity. Thus, the root section 5 is situated at a location relative to the non-dimensional number Q that is equal to 0, whereas the end section 6 is situated at a location relative to the non-dimensional number Q that is equal to unity.

The value of the non-directional number Q equal to 0 corresponds by definition to the radius k corresponding to the root section divided by $R_{max}$, where k is a predetermined constant and $R_{max}$ designates the maximum radius of the rotor.

In this manner, if the blade requires a drive arm, the drive arm lies between a non-dimensional Q that is equal to 0, i.e. a radius r equal to k divided by $R_{max}$, and the value zero for r.

In a preferred embodiment of the blade 1, the stacking line 4 extends at a distance of 30% of the chord starting from the leading edge 2 of the airfoil profile. The swept configuration of the blade 1 nevertheless enables it to avoid coming too close to guide vanes 14 and consequently to avoid constituting an additional source of noise. In addition, the blade 1 thus remains in the blade path 15 of a standard fenestron, regardless of the pitch of the blades (i.e. the angle representative of the aerodynamic angle of incidence, and ignoring an offset). This avoids defining a new blade path and a new passage 12. It is therefore necessary to limit any chord increase. Such a limitation is specifically ensured with a blade 1 even after said blade has been twisted in accordance with the invention.

It should be observed that the term "passage" is used to mean the volume of air defined by the inlet collector 11, the blade path 15, and the diffuser 16 on the outside, and the hub 13 on the inside.

The leading edge 2 thus presents, in continuity from the root section 5 to the end section 6 of the blade 1, a shape that is initially concave and subsequently convex.

The blade 1 also presents a chord that becomes larger going towards the end section 6 over at least the end section 6 of airfoil profile 1f, so as to reach an end chord value that is less than or equal to 1.6 times the value of the reference chord of the root section 5 of the blade 1. This maximum chord value is nevertheless preferably greater than the value of the reference chord, preferably greater or equal to 1.1 times said value of the reference chord, and in particular equal to 1.38 times said value.

Advantageously, the relative thickness of the sections decreases progressively going towards the end section 6 of the blade 1 so as to present a relative thickness lying in the range 9% to 6% and preferably equal to 6.9% at the end of the blade 1.

Furthermore, the relative thickness of the root section may lie in the range 9% to 14% and is preferably equal to 12%.

In an embodiment of the blade 1 in accordance with the invention, the chord varies in application of a relationship of the following kind:

$$C(r) = C_{ref}, \text{ if } k \leq r \leq b_c \times R_{max}$$

and $$C(r) = C_{ref} + [C_{max} - C_{ref}] \times \frac{[r - (b_c \times R_{max})]^n}{\{R_{max} - (b_c \times R_{max})\}^n} \text{ if } r \geq b_c \times R_{max}$$

with:
r: the radius of a current airfoil profile section;
k: radius of the root airfoil profile section;
C(r): value of the chord at a radius r;
$R_{max}$: maximum radius of the end airfoil profile section;
$C_{ref}$: reference chord of the root airfoil profile section;
$C_{max}$: chord of the end airfoil profile section equal to ($a_c \times C_{ref}$) and
$b_c$ and n: first and second predetermined constants.

The second constant n advantageously has a value lying in the range 1 to 5.

In a preferred embodiment, $a_c=1.38$, $b_c=0.68$, and $n=1.7$.

In an embodiment of the blade 1 in accordance with the invention, the shape of the curve constituting the stacking line 4 is given by a polynomial of the following kind:

$$Y_{AC}/C_{ref} = a_e \times Q^3 + b_e \times Q^2 + c_e \times Q \text{ with } 0 \leq Q \leq 1$$

where:

$$Q = \frac{r - k}{R_{max} - k}$$

is a non-dimensional number;
$Y_{AC}$ is the position of the stacking line of the airfoil profile sections for a radius r; and
$a_e$, $b_e$ and $c_e$ are first, second, and third predetermined values.

The first, second, and third values $a_e$, $b_e$ and $c_e$ are advantageously defined so as to obtain a shape for the stacking line 4 that extends with a distribution that is substantially identical on either side of a geometrical mean pitch axis of the blade 1. Such a distribution serves to balance the static pitch control moments that act on the blade 1 about the mean pitch axis.

In order to determine the first, second, and third values $a_e$, $b_e$ and $c_e$, four points are defined on the blade 1, and the curve of the stacking line 4 is required to pass through them. The two end points lie on the mean pitch axis and present an amplitude of zero relative to said mean pitch axis. Two substantially central points are positioned respectively with first and second amplitudes +A and −A relative to the mean pitch axis. By using an interpolation relationship, the curve that passes through these four points is then determined and the looked-for coefficients are obtained.

The first and second amplitudes +A and −A for the stacking line 4 may be defined for example so that A is equal to 0.018 times the maximum radius of the rotor.

In a preferred embodiment, the first, second, and third values are as follows: $a_e=-2.5681$, $b_e=+3.9238$, and $c_e=+1.3558$.

Under such conditions, the above data taken as a whole serves to define the plane extension surface. The geometrical shape of the looked-for blade is then obtained by twisting the airfoil profile sections about the stacking axis in application of a predetermined twisting relationship, i.e. by twisting said plane extension surface.

Figure 3:
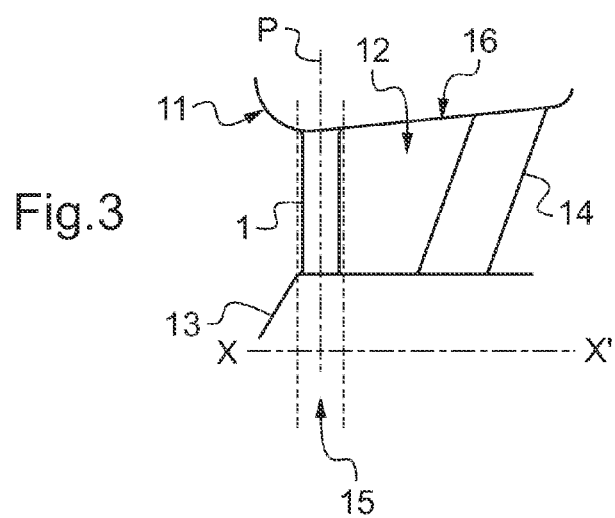
FIG. 3 is a diagrammatic view showing one example of how a blade in accordance with the invention can be mounted in an anti-torque rotor fairing.
Figure 4:
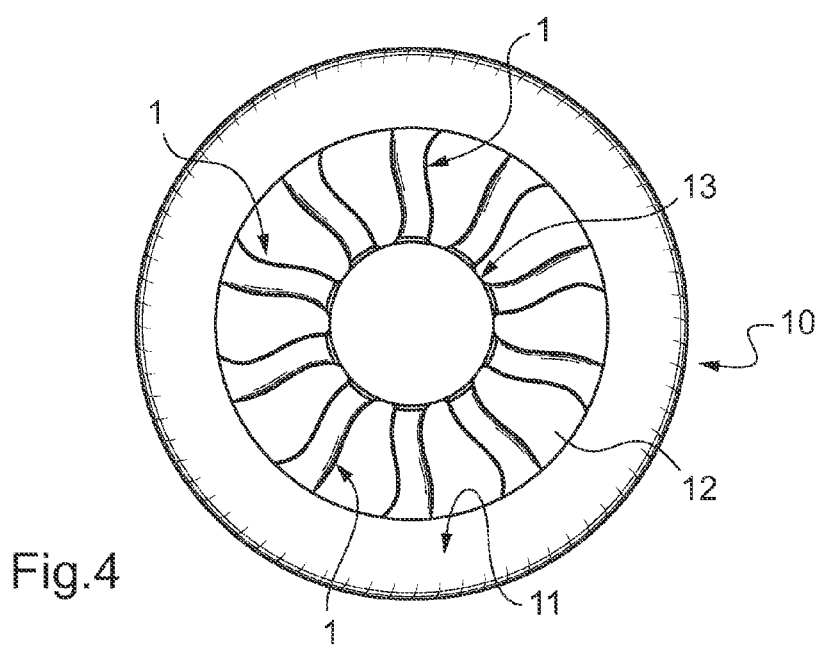
FIG. 4 is a side view of an embodiment of an anti-torque rotor including blades in accordance with the invention.

The objects given to the invention are also achieved by means of an anti-torque device 10, e.g. as shown in FIGS. 3 and 4, comprising a fairing 11 that defines an airflow passage 12 having a rotor 13 placed therein, which rotor has blades 1 as specified above. Members for driving the rotor 13 and members for adjusting the pitch of said blades 1 form parts of such an anti-torque device, but they are not shown in the figures.

The anti-torque device also includes vanes 14 of an airflow guide stator located downstream from the rotor and placed in the passage 12. These vanes 14 serve to define the end of the passage 12 and to stiffen the assembly that constitutes the anti-torque device.

The blade 1 shown very diagrammatically in FIG. 3 extends in a blade path 15, and presents a mean pitch axis P that coincides with the stacking line 4 when the stacking line is straight or that passes through the two ends of said stacking line 4 when it is curved in accordance with the invention. The mean pitch axis P thus extends in line with the arm (not shown) for actuating and driving the blade 1. The guide stator is thus downstream from the blade path 15.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

The invention claimed is:

1. A blade for a tail anti-torque device of a rotorcraft, the device comprising a ducted rotor, the blade having a three-dimensional geometrical shape defined by different airfoil profile sections extending between a leading edge and a trailing edge of the blade and defined radially by a root section and by an end section of the blade; at least two of the airfoil profile sections having different chord values along a stacking line extending from the root section to the end section, the blade being twisted, the stacking line, prior to twisting, defining a plane extension surface defined radially from the root section to the end section, and a twisting line of the plane extension surface that is defined by a predetermined twisting relationship, the stacking line extending at a distance lying in a range 25% to 50% of a respective chord (C) for each of the airfoil profile sections from the leading edge and presenting a curve on the plane extension surface comprising in succession from the root section: a first back sweep; a forward sweep; and finally a last back sweep going to the end section; the end section having an end chord ($c_{max}$) and the root section having a root chord ($C_{ref}$) less than the end chord ($c_{max}$), the end chord ($c_{max}$) being the largest of the respective chords, and the end chord ($C_{max}$) being equal to or less than 1.6 times the root chord ($C_{ref}$) of the root section, wherein the stacking line is a curve traced relative to a radial direction of the tail anti-torque device and given by a polynomial such that:

$$Y_{AC}/C_{ref} = a_e \times Q^3 + b_e \times Q^2 + c_e \times Q \text{ with } 0 \leq Q \leq 1$$

where:

$$Q = \frac{r-k}{R_{max} - k}$$

is a non-dimensional number;
$Y_{AC}$ is a position of the stacking line of the respective airfoil profile sections for a radius r; k is a radius of the root section, $R_{max}$ designates a maximum radius of the end section, and $a_e$, $b_e$ and $c_e$ are first, second, and third predetermined values,
wherein the respective chords (C) are defined by a variable relationship such that a chord value C(r) for a radius r of a respective section of the airfoil profile sections, is given by:

$$C(r) = C_{ref}, \text{ if } k \leq r \leq b_c \times R_{max}$$

and $$C(r) = C_{ref} + [C_{max} - C_{ref}] \times \frac{[r - (b_c \times R_{max})]^n}{\{R_{max} - (b_c \times R_{max})\}^n} \text{ if } r \geq b_c \times R_{max}$$

where k is the radius of the root section, $R_{max}$ designates the maximum radius of the end section, $C_{max}$ designates the chord of the end section and is equal to $a_c \times C_{ref}$, where $a_c$ is a factor, x designates the multiplication sign and $b_c$ and n designate first and second predetermined constants, and
wherein the first predetermined constant $b_c$ lies in a range 0 to 1.

2. The blade according to claim 1, wherein the respective airfoil profile sections present relative thickness that decreases progressively in a radial direction from the root section towards the end section to present a relative thickness at the end section that lies in a range 9% to 6%.

3. The blade according to claim 1, wherein the root section presents a relative thickness that lies in a range 9% to 14%.

4. The blade according to claim 1, wherein the end chord ($c_{max}$) is equal to 1.38 times the root chord ($C_{ref}$) of the root section.

5. The blade according to claim 1, wherein the twisting line corresponds to the stacking line.

6. The blade according to claim 1, wherein the stacking line presents a shape having a curve given by a polynomial of third degree, the stacking line extending at a distance of 30% of the respective chords (C) starting from the leading edge of the respective airfoil profile sections.

7. The blade according to claim 1, wherein the blade has an assembly of six distinct airfoil profile sections along the stacking line.

8. The blade according to claim 1, wherein the leading edge presents in continuity from the root section to the end section a shape that is concave and then convex.

9. The blade according to claim 1, wherein the first predetermined constant $b_c$ is 0.68.

10. The blade according to claim 9, wherein the second predetermined constant n is 1.7.

11. The blade according to claim 1, wherein the second predetermined constant n lies in a range 1 to 5.

12. The blade according to claim 1, wherein the first, second, and third predetermined values $a_e$, $b_e$, and $c_e$ are selected to obtain the stacking line that extends in a distribution that is substantially identical on either side of a geometrical pitch axis of the blade, the distribution balancing static pitch control moments acting on the blade.

13. The blade according to claim 1, wherein the first predetermined value $a_e$ is −2.5681, the second predetermined value $b_e$ is +3.9238, and the third predetermined value $c_e$ is +1.3558.

14. An anti-torque device comprising a fairing defining an airflow passage having a rotor placed therein together with members for driving the rotor and members for adjusting a pitch of a blade, wherein the rotor is provided with a plurality of blades made in accordance with claim 1.

15. The anti-torque device according to claim 14, wherein the device includes an airflow guiding stator downstream from a blade path of the plurality of blades of the rotor, the guide stator being provided with profiled vanes.

16. A blade for a tail ducted rotor of a rotorcraft, the blade having a twisted three-dimensional geometrical shape defined by a plurality of airfoil profile sections extending between a leading edge and a trailing edge of the blade and defined radially by a root section and by an end section of the blade; at least two of the airfoil profile sections having chord values that differ from each other along a stacking line extending from the root section to the end section, the stacking line, prior to twisting, defining a plane extension surface defined radially from the root section to the end section, the blade having a twisting line of the plane extension surface defined by a predetermined twisting relationship, the stacking line extending at a distance that 25% to 50% of a respective chord (C) for each respective airfoil profile section from the leading edge and presenting a curve on the plane extension surface comprising in succession from the root section: a first back sweep; a forward sweep; and a last back sweep going to the end section; the end section having an end chord ($c_{max}$) and the root section having a root chord ($C_{ref}$), the root chord ($C_{ref}$) being smaller than the end chord ($c_{max}$), the end chord ($c_{max}$) being the largest of the respective chord and being no more than 1.6 times the root chord ($C_{ref}$) of the root section, the stacking line being a curve traced relative to a radial direction of the tail ducted rotor and given by a polynomial according to:

$$Y_{AC}/C_{ref} = a_e \times Q^3 + b_e \times Q^2 + c_e \times Q \text{ with } 0 \leq Q \leq 1$$

where:

$$Q = \frac{r-k}{R_{max} - k}$$

is a non-dimensional number;
$Y_{AC}$ is a position of the stacking line of the respective airfoil profile sections for a radius r; k is a radius of the root section, $R_{max}$ designates a maximum radius of the end section, and $a_e$, $b_e$, and $c_e$ are first, second, and third predetermined values,
wherein the respective chords (C) are defined by a variable relationship such that a chord value C(r) for a radius r of a respective section of the airfoil profile sections, is given by:

$$C(r) = C_{ref}, \text{ if } k \leq r \leq b_c \times R_{max}$$

and $$C(r) = C_{ref} + [C_{max} - C_{ref}] \times \frac{[r - (b_c \times R_{max})]^n}{\{R_{max} - (b_c \times R_{max})\}^n} \text{ if } r \geq b_c \times R_{max}$$

where k is a radius of the root section, , $R_{max}$ designates the maximum radius of the end section, $C_{max}$ designates the chord of the end section and is equal to $a_c \times C_{ref}$, where $a_c$ is a factor, × designates the multiplication sign and $b_c$ and n designate first and second predetermined constants, and
wherein the first, second, and third predetermined values $a_e$, $b_e$, and $c_e$ are selected to obtain the stacking line that extends in a distribution that is substantially identical on either side of a geometrical pitch axis of the blade, the distribution balancing static pitch control moments acting on the blade, wherein the second predetermined constant n lies in a range 1 to 5.

17. The blade according to claims 16, wherein the first predetermined constant $b_c$ lies in a range 0 to 1.

18. A blade for a tail anti-torque device of a rotorcraft, the device comprising a ducted rotor, the blade having a three-dimensional geometrical shape defined by different airfoil profile sections extending between a leading edge and a trailing edge of the blade and defined radially by a root section and by an end section of the blade; at least two of the airfoil profile sections having different chord values along a stacking line extending from the root section to the end section, the blade being twisted, the stacking line, prior to twisting, defining a plane extension surface defined radially from the root section to the end section, and a twisting line of the plane extension surface that is defined by a predetermined twisting relationship, the stacking line extending at a distance lying in a range 25% to 50% of a respective chord (C) for each of the airfoil profile sections from the leading edge and presenting a curve on the plane extension surface comprising in succession from the root section: a first back sweep; a forward sweep; and finally a last back sweep going to the end section; the end section having an end chord ($c_{max}$) and the root section having a root chord ($C_{ref}$) less than the end chord ($c_{max}$), the end chord ($c_{max}$) being the largest of the respective chords, and the end chord ($C_{max}$) being equal to or less than 1.6 times the root chord ($C_{ref}$) of the root section, wherein the stacking line is a curve traced relative to a radial direction of the tail anti-torque device and given by a polynomial such that:

$$Y_{AC}/C_{ref} = a_e \times Q^3 + b_e \times Q^2 + c_e \times Q \text{ with } 0 \leq Q \leq 1$$

where:

$$Q = \frac{r-k}{R_{max} - k}$$

is a non-dimensional number;
$Y_{AC}$ is a position of the stacking line of the respective airfoil profile sections for a radius r; k is a radius of the root section, $R_{max}$ designates a maximum radius of the end section, and $a_e$, $b_e$, and $c_e$ are first, second, and third predetermined values,
wherein the respective chords (C) are defined by a variable relationship such that a chord value C(r) for a radius r of a respective section of the airfoil profile sections, is given by:

$$C(r) = C_{ref}, \text{ if } k \leq r \leq b_c \times R_{max}$$

and $$C(r) = C_{ref} + [C_{max} - C_{ref}] \times \frac{[r - (b_c \times R_{max})]^n}{\{R_{max} - (b_c \times R_{max})\}^n} \text{ if } r \geq b_c \times R_{max}$$

where k is the radius of the root section, $R_{max}$ designates the maximum radius of the end section, $C_{max}$ designates the chord of the end section and is equal to $a_c \times C_{ref}$, where $a_c$ is a factor, × designates the multiplication sign and $b_c$ and n designate first and second predetermined constants, and
wherein the second predetermined constant n lies in a range 1 to 5.

19. The blade according to claim 18, wherein the first predetermined value $a_e$, is −2.5681, the second predetermined value $b_e$ is +3.9238, and the third predetermined value $c_e$, is +1.3558.

* * * * *